United States Patent
Matter et al.

(10) Patent No.: US 11,021,566 B2
(45) Date of Patent: Jun. 1, 2021

(54) RHEOLOGY-MODIFYING URETHANE COMPOUND

(71) Applicant: COATEX, Genay (FR)

(72) Inventors: Yves Matter, Quincieux (FR); Denis Ruhlmann, Genay (FR); Jean-Marc Suau, Lucenay (FR)

(73) Assignee: COATEX, Genay (FR)

( * ) Notice: Subject to any disclaimer, the term of this patent is extended or adjusted under 35 U.S.C. 154(b) by 0 days.

(21) Appl. No.: 16/337,037

(22) PCT Filed: Oct. 20, 2017

(86) PCT No.: PCT/FR2017/052884
§ 371 (c)(1),
(2) Date: Mar. 27, 2019

(87) PCT Pub. No.: WO2018/073545
PCT Pub. Date: Apr. 26, 2018

(65) Prior Publication Data
US 2020/0031985 A1 Jan. 30, 2020

(30) Foreign Application Priority Data

Oct. 20, 2016 (FR) ...................................... 1660180

(51) Int. Cl.
| | |
|---|---|
| *C08G 18/71* | (2006.01) |
| *C08G 18/28* | (2006.01) |
| *C08G 18/32* | (2006.01) |
| *C08G 18/48* | (2006.01) |
| *C08G 18/79* | (2006.01) |

(52) U.S. Cl.
CPC ......... *C08G 18/71* (2013.01); *C08G 18/2825* (2013.01); *C08G 18/3203* (2013.01); *C08G 18/4833* (2013.01); *C08G 18/4854* (2013.01); *C08G 18/792* (2013.01)

(58) Field of Classification Search
CPC ................ C08G 18/71; C08G 18/2825; C08G 18/3203; C08G 18/4833; C08G 18/4854; C08G 18/792
USPC ......................................................... 560/157
See application file for complete search history.

(56) References Cited

U.S. PATENT DOCUMENTS

| | | | | |
|---|---|---|---|---|
| 4,180,491 A | * | 12/1979 | Kim ................... | C08G 18/2805 524/317 |
| 2010/0152375 A1 | | 6/2010 | Kensicher | |
| 2012/0101223 A1 | | 4/2012 | Rabasco et al. | |
| 2014/0011967 A1 | | 1/2014 | Rabasco et al. | |

FOREIGN PATENT DOCUMENTS

| | | |
|---|---|---|
| EP | 2 444 432 A1 | 4/2012 |
| FR | 2 894 980 A1 | 6/2007 |
| FR | 2894980 A1 * | 6/2007 ........... C11D 17/003 |

OTHER PUBLICATIONS

International Search Report dated Jan. 18, 2018 in PCT/FR2017/052884 filed on Oct. 20, 2017.

* cited by examiner

*Primary Examiner* — Deborah D Carr
(74) *Attorney, Agent, or Firm* — Oblon, McClelland, Maier & Neustadt, L.L.P.

(57) ABSTRACT

The invention relates to a rheology-modifying urethane compound. The compound comprising urethane functions of the invention can be prepared according to a method in several steps which use different compounds comprising isocyanate functions. For the preparation of the urethane compound according to the invention, a monoisocyanate compound, in particular a monoisocyanate compound resulting from the separate condensation of an asymmetric diisocyanate compound with a reactive compound, is reacted with an alkylene glycol compound in the presence of a polyisocyanate compound. The invention also provides coating compositions comprising mineral particles and a urethane compound according to the invention.

16 Claims, No Drawings

RHEOLOGY-MODIFYING URETHANE COMPOUND

The invention relates to a rheology-modifying compound. The compound containing urethane functions of the invention may be prepared according to a method in several steps which use compounds containing different isocyanate functions. For the preparation of the urethane compound according to the invention, a monoisocyanate compound, in particular a monoisocyanate compound resulting from the separate condensation of a dissymmetric diisocyanate compound with a reactive compound, is reacted with an alkylene glycol compound in the presence of a polyisocyanate compound. The invention also provides coating compositions comprising mineral particles and a urethane compound according to the invention.

Generally, for aqueous coating compositions, and in particular for aqueous paint or varnish compositions, it is necessary to control the viscosity both for low or medium shear gradients and for high shear gradients. Specifically, a paint formulation is subjected, during the preparation thereof, the storage thereof, the application thereof or the drying of, to numerous constraints requiring particularly complex rheological properties.

During the storage of the paint, pigment particles tend to settle via gravity. Stabilizing the dispersion of these pigment particles then makes it necessary to have a paint formulation that has a high viscosity at very low shear gradients corresponding to the maximum velocity of the particles.

The paint uptake is the amount of paint picked up using an application tool, a paintbrush, a brush or a roller for example. The tool immersed in and then withdrawn from the pot of paint that picks up a large amount of paint will therefore avoid having to be reimmersed more frequently. The paint uptake is an increasing function of the viscosity. The calculation of the equivalent shear gradient is a function of the flow rate of the paint for a particular thickness of paint on the tool. The paint formulation should therefore also have a high viscosity at low or medium shear gradients.

Furthermore, a high filling property of the paint should be sought so that, during the application thereof on a substrate, a large amount of paint is deposited during each pass. A high filling property then makes it possible to obtain a greater wet film during each pass of the tool. A high viscosity of the paint formulation should therefore be sought at high shear gradients.

A high viscosity at high shear gradients will also make it possible to reduce or eliminate the risk of formation of splashes or droplets during the application of the paint.

A reduced viscosity at low or medium share gradients will also make it possible to obtain a good taut appearance after application of the paint, in particular of a one-coat paint, on a substrate, the coated surface of which will then have a very uniform appearance without bumps or hollows. The final visual appearance of the dry film is then much better.

Furthermore, after the deposition thereof on a surface, in particular a vertical surface, the paint should not form sagging. It is then necessary for the paint formulation to have a high viscosity at low and medium shear gradients.

Finally, after the deposition thereof on a surface, the paint should have a high levelling ability. A reduced viscosity at low and medium shear gradients of the paint formulation is then required.

Compounds of HEUR (hydrophobically modified ethoxylated urethanes) type are known as rheology modifiers.

Document U.S. Pat. No. 4,180,491 describes the preparation of various polyurethane compounds. During the preparation of these compounds, a first step consists in reacting a polyethylene glycol (PEG) with a monoisocyanate, until complete consumption of the isocyanate functions of the monoisocyanate. Then, in a second step, the PEG-monoisocyanate condensate, produced during the first step, is reacted with a triisocyanate compound.

Documents EP 2 444 432 and FR 2 894 980 describe urethane compounds and also the use thereof.

However, known HEUR-type compounds do not always make it possible to provide a satisfactory solution. In particular, the rheology-modifying compounds of the prior art did not make it possible to satisfactorily improve the compromise between Stormer viscosity (measured at low or medium shear gradients and expressed in KU units) and ICI viscosity (measured at high or very high shear gradients and expressed in $s^{-1}$). In particular, the known rheology-modifying compounds do not always make it possible to increase the ICI viscosity/Stormer viscosity ratio.

There is therefore a need to have improved rheology modifiers.

The urethane compound according to the invention makes it possible to provide a solution to all or some of the problems of the rheology modifiers of the prior art.

Thus, the invention provides a urethane compound prepared in the absence of any diisocyanate compound, by reaction:

(A) of at least one monoisocyanate compound selected from:
  (A1) a compound comprising a single isocyanate function and
  (A2) at least one monoisocyanate compound resulting from the separate reaction
    (A2-1) of at least one compound comprising at least one labile hydrogen atom and
    (A2-2) of at least one dissymmetric diisocyanate compound,
(B) of at least one isocyanate compound comprising more than 2 isocyanate functions, and
(C) of at least one compound of formula (I):

$$(HO)\text{-}L_n\text{-}(OH) \qquad (I)$$

in which L represents, independently, a poly(alkylene glycol) residue and n represents a number ranging from 40 to 400.

Preferably, according to the invention, the condensation of the compounds (A), (B) and (C) is carried out in the presence of a catalyst. This catalyst may be selected from acetic acid, an amine, preferably from 1,8-diazabicyclo[5.4.0]undec-7-ene (DBU), a derivative of a metal selected from Al, Bi, Sn, Hg, Pb, Mn, Zn, Zr, Ti. Traces of water may also participate in the catalysis of the reaction. As examples of metal derivatives, a derivative selected from dibutylbismuth dilaurate, dibutylbismuth diacetate, dibutylbismuth oxide, bismuth carboxylate, dibutyltin dilaurate, dibutyltin diacetate, dibutyltin oxide, a mercury derivative, a lead derivative, zinc salts, manganese salts, a compound comprising zirconium chelate, a compound comprising aluminium chelate is preferred. The preferred metal derivative is selected from a Bi derivative and a Sn derivative.

Advantageously, the urethane compound according to the invention is a compound that has a hydrophilic character. It may be formulated in an aqueous medium.

According to the invention, the monoisocyanate compounds (A1) and (A2) comprise only a single isocyanate function. These are reactants that are known per se or else that are prepared for the purposes of the invention. Thus, the compounds (A1) and (A2) comprise only a single isocyanate function that is reactive during the reaction with the compounds (B) and (C). The reaction of these monoisocyanate compounds (A1) and (A2) with the compounds (B) and (C) is therefore indeed carried out in the absence of diisocyanate compound.

Preferably according to the invention, the monoisocyanate compound (A1) is a compound of formula (II):

in which R represents a linear, branched or cyclic, saturated, unsaturated or aromatic hydrocarbon group, preferably a linear, branched or cyclic alkyl group comprising from 6 to 20 carbon atoms or a linear, branched or cyclic alkenyl group comprising from 6 to 20 carbon atoms.

Also preferably according to the invention, the monoisocyanate compound (A1) is a compound selected from:
- aromatic monoisocyanate compounds, in particular phenyl isocyanate, diphenylmethane monoisocyanate, 2-phenylethyl isocyanate, 4-tolyl isocyanate, 2-tolyl isocyanate, 2,5-dimethylphenyl isocyanate, 3,4-dimethylphenyl isocyanate, 2,3-dimethylphenyl isocyanate, 4-isocyanato-4'-methyldiphenylmethane;
- polyfunctional aromatic monoisocyanate compounds, in particular 2-methoxy-4-nitrophenyl isocyanate, polymethylene polyphenyl isocyanate,
- alkyl monoisocyanate compounds, in particular hexyl isocyanate, heptyl isocyanate, octyl isocyanate, n-nonyl isocyanate, decyl isocyanate, undecyl isocyanate, dodecyl isocyanate, tridecyl isocyanate, tetradecyl isocyanate, cetyl isocyanate, 2-ethylhexyl isocyanate, n-octyl isocyanate, isononyl isocyanate, stearyl isocyanate;
- cycloalkyl monoisocyanate compounds, in particular cyclohexyl isocyanate, 1-isocyanatomethyl-1,3,3-trimethylcyclohexane.

The preferred monoisocyanate compounds (A1) are 2-ethylhexanol isocyanate, hexyl isocyanate, heptyl isocyanate, octyl isocyanate, n-nonyl isocyanate, 2-ethylhexyl isocyanate, n-octyl isocyanate, isononyl isocyanate.

According to the invention, the compound (A2) is derived from the prior and separate reaction of at least one compound (A2-1) and of at least one compound (A2-2).

Advantageously according to the invention, the urethane compound according to the invention is prepared by the use of a molar amount of compound (A2-1) which is greater than or equal to the molar amount of compound (A2-2). Preferably, the molar amount of functions comprising at least one labile hydrogen atom, in particular the molar amount of hydroxyl groups, of the compound (A2-1) is greater than or equal to the molar amount of isocyanate functions of the compound (A2-2).

Thus, the diisocyanate compound (A2-2) is completely converted or completely consumed during the reaction for preparing the monoisocyanate compound (A2). It is not present and does not therefore take part, as it is, during the reaction which uses the compounds (B) and (C).

Furthermore and essentially according to the invention, the dissymmetric character of the diisocyanate compound (A2-2) results in a reactivity different from the two isocyanate functions that it comprises. Indeed, generally, the reaction kinetics of the two isocyanate functions are different. Thus, the urethane compound according to the invention is functionalized in a controlled manner.

As another monoisocyanate compound, the condensation reaction according to the invention may therefore also use a monoisocyanate compound (A2). According to the invention, the compound (A2) is prepared during a reaction separate from the condensation reaction according to the invention. The monoisocyanate compound (A2) is therefore derived from the reaction:
- (A2-1) of at least one compound comprising at least one labile hydrogen atom and
- (A2-2) of at least one dissymmetric diisocyanate compound.

Preferably according to the invention, the reaction for preparing the compound (A2) is a catalysed reaction.

More preferably according to the invention, the reaction is catalysed by means of acetic acid, an amine, preferably 1,8-diazabicyclo[5.4.0]undec-7-ene (DBU) or at least one derivative of a metal selected from Al, Bi, Sn, Hg, Pb, Mn, Zn, Zr, Ti. Traces of water may also participate in the catalysis of the reaction.

As examples of metal derivatives, a derivative selected from dibutylbismuth dilaurate, dibutylbismuth diacetate, dibutylbismuth oxide, bismuth carboxylate, dibutyltin dilaurate, dibutyltin diacetate, dibutyltin oxide, a mercury derivative, a lead derivative, zinc salts, manganese salts, a compound comprising zirconium chelate, a compound comprising aluminium chelate is preferred. The preferred metal derivative is selected from a Bi derivative and a Sn derivative.

According to the invention, the monoisocyanate compound (A2) is therefore prepared by prior condensation of at least one compound (A2-1) and of at least one compound (A2-2). Once the condensation reaction has been carried out, the monoisocyanate compound (A2) has only a single residual reactive isocyanate function.

The compound (A2-1) is preferentially a compound comprising at least one labile hydrogen atom that is reactive with the disymmetric diisocyanate compound. More preferentially, it is a compound (A2-1) comprising at least one hydroxyl group. Particularly preferably, the compound (A2-1) is a monoalcohol, for example a $C_5$-$C_{14}$ linear, branched or cyclic monoalcohol, in particular a $C_6$-$C_{14}$ linear or branched monoalcohol, especially a $C_8$-$C_{12}$ linear, branched or cyclic monoalcohol.

As other compounds (A2-1) according to the invention, it is possible to use a compound comprising a primary amine function or a secondary amine function; a carboxylic acid; a mercaptan compound.

The compound (A2-2) is preferentially a compound selected from dissymmetric aromatic diisocyanate compounds and dissymmetric alicyclic diisocyanate compounds. As preferred examples of compounds (A2-2), use may be made of a compound selected from 2,4'-methylenediphenyl diisocyanate (2,4'-MDI), 2,4'-dibenzyl diisocyanate (2,4'-DBDI), 2,4-toluene diisocyanate (2,4-TDI) and isophorone diisocyanate (IPDI).

Besides the monoisocyanate compound (A), the condensation reaction also uses a compound (B) which comprises more than 2 isocyanate functions. Preferably, the compound (B) is an isocyanate compound comprising 3, 4, 5 or 6 isocyanate functions. More preferentially, it comprises 3 isocyanate functions.

According to the invention, the compound (B) may also be selected from the isocyanate compounds comprising more than 2.5 isocyanate functions, preferably more than 2.6 isocyanate functions, more preferentially more than 2.7 isocyanate functions, more preferentially still 3 or more than 3 isocyanate functions.

As examples of preferred compounds (B) according to the invention, use is made of:
- triphenylmethane-4,4',4''-triisocyanate or 1,1',1''-methylidynetris (4-isocyanatobenzene); or
- an isocyanurate compound, in particular an isocyanurate compound of a compound selected from:
  - symmetric aromatic diisocyanate compounds, preferably:
    - 2,2'-methylenediphenyl diisocyanate (2,2'-MDI) and 4,4'-methylenediphenyl diisocyanate (4,4'-MDI);
    - 4,4'-dibenzyl diisocyanate (4,4'-DBDI);
    - 2,6-toluene diisocyanate (2,6-TDI);
    - m-xylene diisocyanate (m-XDI);

symmetric alicyclic diisocyanate compounds, preferably methylene bis(4-cyclohexylisocyanate) ($H_{12}MDI$);

symmetric aliphatic diisocyanate compounds, preferably hexamethylene diisocyanate (HDI), pentamethylene diisocyanate (PDI);

dissymmetric aromatic diisocyanate compounds, preferably:
2,4'-methylenediphenyl diisocyanate (2,4'-MDI);
2,4'-dibenzyl diisocyanate (2,4'-DBDI);
2,4-toluene diisocyanate (2,4-TDI);

a trimer compound of biuret, in particular a trimer compound of biuret of a compound selected from:
symmetric aromatic diisocyanate compounds, preferably:
2,2'-methylenediphenyl diisocyanate (2,2'-MDI) and 4,4'-methylenediphenyl diisocyanate (4,4'-MDI);
4,4'-dibenzyl diisocyanate (4,4'-DBDI);
2,6-toluene diisocyanate (2,6-TDI);
m-xylylene diisocyanate (m-XDI);

symmetric alicyclic diisocyanate compounds, preferably methylene bis(4-cyclohexylisocyanate) ($H_{12}MDI$);

symmetric aliphatic diisocyanate compounds, preferably hexamethylene diisocyanate (HDI), pentamethylene diisocyanate (PDI);

dissymmetric aromatic diisocyanate compounds, preferably:
2,4'-methylenediphenyl diisocyanate (2,4'-MDI);
2,4'-dibenzyl diisocyanate (2,4'-DBDI);
2,4-toluene diisocyanate (2,4-TDI);

dissymmetric alicyclic diisocyanate compounds, preferably isophorone diisocyanate (IPDI).

According to the invention, the compound (B) is preferentially selected from triphenylmethane-4,4',4"-triisocyanate, 1,1',1"-methylidynetris(4-isocyanatobenzene), an HDI isocyanurate, an IPDI isocyanurate, a PDI isocyanurate, an HDI biuret trimer and an IPDI biuret trimer, a PDI biuret trimer.

Besides the compounds (A) and (B), the condensation reaction also uses a compound (C) of formula (I).

Preferably, the compound (C) is a compound of formula (I) in which:
L represents, independently, a poly(ethylene glycol) residue; or
n represents a number ranging from 50 to 400; or
L represents, independently, a poly(ethylene glycol) residue and n represents a number ranging from 50 to 400.

More preferably, the compound (C) is a compound of formula (I) in which:
L represents, independently, a poly(ethylene glycol) residue; or
n represents a number ranging from 100 to 300; or
L represents, independently, a poly(ethylene glycol) residue and n represents a number ranging from 100 to 300.

Also preferably according to the invention, the compound (C) is a compound for which the molar mass ($M_w$) ranges from 1,500 to 20,000 g/mol, preferably from 2,000 to 20,000 g/mol, more preferentially from 4,000 to 15,000 g/mol. According to the invention, the molar mass is calculated from the hydroxyl value determined according to standard DIN 53240-1, henceforth standard DIN EN ISO 4629-1, by applying the formula:

(56,100×OH group functionality)/hydroxyl value.

During the condensation reaction that makes it possible to prepare the urethane compound according to the invention, the amounts of compounds (A), (B) and (C) may vary.

Preferably, the molar amount of compound (C) is around two times lower than the molar amount of monoisocyanate compound (A).

Besides a urethane compound, the invention also relates to a method for preparing this compound. Thus, the invention provides a method for preparing a urethane compound in the absence of any diisocyanate compound, by reaction:
(A) of at least one monoisocyanate compound selected from:
(A1) a compound comprising a single isocyanate function and
(A2) at least one monoisocyanate compound resulting from the separate reaction
(A2-1) of at least one compound comprising at least one labile hydrogen atom and
(A2-2) of at least one dissymmetric diisocyanate compound,
(B) of at least one isocyanate compound comprising more than 2 isocyanate functions, and
(C) of at least one compound of formula (I):

$$(HO)\text{-}L_n\text{-}(OH) \tag{I}$$

in which L represents, independently, a poly(alkylene gylcol) residue and n represents a number ranging from 40 to 400.

Preferably, according to the invention for the method according to the invention, the condensation of the compounds (A), (B) and (C) is carried out in the presence of a catalyst. This catalyst may be selected from acetic acid, an amine, preferably 1,8-diazabicyclo[5.4.0]undec-7-ene (DBU), a derivative of a metal selected from Al, Bi, Sn, Hg, Pb, Mn, Zn, Zr, Ti, preferably selected from dibutylbismuth dilaurate, dibutylbismuth diacetate, dibutylbismuth oxide, bismuth carboxylate, dibutyltin dilaurate, dibutyltin diacetate, dibutyltin oxide, a mercury derivative, a lead derivative, zinc salts, manganese salts, a compound comprising zirconium chelate, a compound comprising aluminium chelate. The preferred metal derivative is selected from a Bi derivative and a Sn derivative.

For the method according to the invention, the monoisocyanate compounds (A1) and (A2) comprise only a single isocyanate function. The reaction of these compounds with the compounds (B) and (C) is therefore indeed carried out in the absence of diisocyanate compound.

Preferably for the method according to the invention, the monoisocyanate compound (A1) is a compound of formula (II):

$$R\text{—NCO} \tag{II}$$

in which R represents a linear, branched or cyclic, saturated, unsaturated or aromatic hydrocarbon group, preferably a linear, branched or cyclic alkyl group comprising from 6 to 20 carbon atoms or a linear, branched or cyclic alkenyl group comprising from 6 to 20 carbon atoms.

Also preferably for the method according to the invention, the monoisocyanate compound (A1) is a compound selected from:
aromatic monoisocyanate compounds, in particular phenyl isocyanate, diphenylmethane monoisocyanate, 2-phenylethyl isocyanate, 4-tolyl isocyanate, 2-tolyl isocyanate, 2,5-dimethylphenyl isocyanate, 3,4-dimethylphenyl isocyanate, 2,3-dimethylphenyl isocyanate, 4-isocyanato-4'-methyldiphenylmethane;
polyfunctional aromatic monoisocyanate compounds, in particular 2-methoxy-4-nitrophenyl isocyanate, polymethylene polyphenyl isocyanate,
alkyl monoisocyanate compounds, in particular hexyl isocyanate, heptyl isocyanate, octyl isocyanate, n-nonyl isocyanate, decyl isocyanate, undecyl isocyanate, dodecyl isocyanate, tridecyl isocyanate, tetradecyl isocyanate, cetyl isocyanate, 2-ethylhexyl isocyanate, n-octyl isocyanate, isononyl isocyanate, stearyl isocyanate;

cycloalkyl monoisocyanate compounds, in particular cyclohexyl isocyanate, 1-isocyanatomethyl-1,3,3-trimethylcyclohexane.

The preferred compounds (A1) are 2-ethylhexanol isocyanate, hexyl isocyanate, heptyl isocyanate, octyl isocyanate, n-nonyl isocyanate, 2-ethylhexyl isocyanate, n-octyl isocyanate, isononyl isocyanate.

For the method according to the invention, the monoisocyanate compound (A2) is therefore prepared by separate and prior condensation of at least one compound (A2-1) and of at least one compound (A2-2).

Advantageously for the method according to the invention, the compound (A2-1) is used in a molar amount which is greater than or equal to the molar amount of compound (A2-2). Preferably for the method according to the invention, the molar amount of functions comprising at least one labile hydrogen atom, in particular the molar amount of hydroxyl groups, of the compound (A2-1) is greater than or equal to the molar amount of isocyanate functions of the compound (A2-2). Thus, the diisocyanate compound (A2-2) is completely converted during the reaction for preparing the compound (A2). It is not present as diisocyanate compound owing to the fact that one of its isocyanate functions has reacted with the compound (A2-1). It does not therefore take part during the reaction which uses the compounds (B) and (C).

Furthermore and essentially for the method according to the invention, the dissymmetric character of the diisocyanate compound (A2-2) results in a reactivity different from the two isocyanate functions that it comprises. Indeed, generally, the reaction kinetics of the two isocyanate functions are different. Thus, the method according to the invention makes it possible to control the functionality of the urethane compound prepared.

As another monoisocyanate compound, the method according to the invention may also use a monoisocyanate compound (A2). For the method according to the invention, the compound (A2) is prepared during a reaction separate from the condensation reaction according to the invention. The monoisocyanate compound (A2) is therefore derived from the reaction:
(A2-1) of at least one compound comprising at least one labile hydrogen atom and
(A2-2) of at least one dissymmetric diisocyanate compound.

Preferably for the method according to the invention, the reaction for preparing the monoisocyanate compound (A2) is a catalysed reaction.

More preferably for the method according to the invention, the reaction is catalysed by means of acetic acid, an amine, preferably by means of 1,8-diazabicyclo[5.4.0]undec-7-ene (DBU), or at least one derivative of a metal selected from Al, Bi, Sn, Hg, Pb, Mn, Zn, Zr, Ti. Traces of water may also participate in the catalysis of the reaction.

As examples of metal derivatives, a derivative selected from dibutylbismuth dilaurate, dibutylbismuth diacetate, dibutylbismuth oxide, bismuth carboxylate, dibutyltin dilaurate, dibutyltin diacetate, dibutyltin oxide, a mercury derivative, a lead derivative, zinc salts, manganese salts, a compound comprising zirconium chelate, a compound comprising aluminium chelate is preferred. The preferred metal derivative is selected from a Bi derivative and a Sn derivative.

For the method according to the invention, the monoisocyanate compound (A2) is therefore prepared by prior condensation of at least one compound (A2-1) and of at least one compound (A2-2).

The compound (A2-1) is preferentially a compound comprising at least one labile hydrogen atom that is reactive with the disymmetric diisocyanate compound. More preferentially, it is a compound (A2-1) comprising at least one hydroxyl group. Particularly preferably, the compound (A2-1) is a monoalcohol, for example a $C_5$-$C_{14}$ linear, branched or cyclic monoalcohol, in particular a $C_6$-$C_{14}$ linear, branched or cyclic monoalcohol, especially a $C_8$-$C_{12}$ linear, branched or cyclic monoalcohol. As other compounds (A2-1) according to the invention, it is possible to use a compound comprising a primary amine function or a secondary amine function; a carboxylic acid; a mercaptan compound.

The compound (A2-2) is preferentially a compound selected from dissymmetric aromatic diisocyanate compounds and dissymmetric alicyclic diisocyanate compounds. As preferred examples of compounds (A2-2), use may be made of a compound selected from 2,4'-methylenediphenyl diisocyanate (2,4'-MDI), 2,4'-dibenzyl diisocyanate (2,4'-DBDI), 2,4-toluene diisocyanate (2,4-TDI) and isophorone diisocyanate (IPDI).

Besides the monoisocyanate compound (A), the method according to the invention also uses a compound (B) which comprises more than 2 isocyanate functions. Preferably for the method according to the invention, the compound (B) is an isocyanate compound comprising 3, 4, 5 or 6 isocyanate functions. More preferentially, it comprises 3 isocyanate functions.

For the method according to the invention, the compound (B) may also be selected from isocyanate compounds comprising more than 2.5 isocyanate functions, preferably more than 2.6 isocyanate functions, more preferentially more than 2.7 isocyanate functions, more preferentially still 3 or more than 3 isocyanate functions. As examples of preferred compounds (B) according to the method of the invention, use is made of:

triphenylmethane-4,4',4"-triisocyanate or 1,1',1"-methylidynetris (4-isocyanatobenzene); or
an isocyanurate compound, in particular an isocyanurate compound of a compound selected from:
symmetric aromatic diisocyanate compounds, preferably:
2,2'-methylenediphenyl diisocyanate (2,2'-MDI) and 4,4'-methylenediphenyl diisocyanate (4,4'-MDI);
4,4'-dibenzyl diisocyanate (4,4'-DBDI);
2,6-toluene diisocyanate (2,6-TDI);
m-xylylene diisocyanate (m-XDI);
symmetric alicyclic diisocyanate compounds, preferably methylene bis(4-cyclohexylisocyanate) ($H_{12}$MDI);
symmetric aliphatic diisocyanate compounds, preferably hexamethylene diisocyanate (HDI);
dissymmetric aromatic diisocyanate compounds, preferably:
2,4'-methylenediphenyl diisocyanate (2,4'-MDI);
2,4'-dibenzyl diisocyanate (2,4'-DBDI);
2,4-toluene diisocyanate (2,4-TDI);
a trimer compound of biuret, in particular a trimer compound of biuret of a compound selected from:
symmetric aromatic diisocyanate compounds, preferably:
2,2'-methylenediphenyl diisocyanate (2,2'-MDI) and 4,4'-methylenediphenyl diisocyanate (4,4'-MDI);
4,4'-dibenzyl diisocyanate (4,4'-DBDI);
2,6-toluene diisocyanate (2,6-TDI);
m-xylylene diisocyanate (m-XDI);
symmetric alicyclic diisocyanate compounds, preferably methylene bis(4-cyclohexylisocyanate) ($H_{12}$MDI);
symmetric aliphatic diisocyanate compounds, preferably hexamethylene diisocyanate (HDI);

dissymmetric aromatic diisocyanates compounds, preferably:
2,4'-methylenediphenyl diisocyanate (2,4'-MDI);
2,4'-dibenzyl diisocyanate (2,4'-DBDI);
2,4-toluene diisocyanate (2,4-TDI);
dissymmetric alicyclic diisocyanate compounds, preferably isophorone diisocyanate (IPDI).

For the method according to the invention, the compound (B) is preferentially selected from triphenylmethane-4,4',4''-triisocyanate, 1,1',1''-methylidynetris(4-isocyanatobenzene), an HDI isocyanurate, an IPDI isocyanurate, an HDI biuret trimer and an IPDI biuret trimer.

Besides the compounds (A) and (B), the method according to the invention also uses a compound (C) of formula (I). Preferably, the compound (C) is a compound of formula (I) in which:
L represents, independently, a poly(ethylene glycol) residue; or
n represents a number ranging from 50 to 400; or
L represents, independently, a poly(ethylene glycol) residue and n represents a number ranging from 50 to 400.

More preferably, the compound (C) is a compound of formula (I) in which:
L represents, independently, a poly(ethylene glycol) residue; or
n represents a number ranging from 100 to 300; or
L represents, independently, a poly(ethylene glycol) residue and n represents a number ranging from 100 to 300.

Also preferably for the method according to the invention, the compound (C) is a compound for which the molar mass ($M_w$) ranges from 1,500 to 20,000 g/mol, preferably from 2,000 to 20,000 g/mol, more preferentially from 4,000 to 15,000 g/mol.

During the condensation reaction that makes it possible to prepare the urethane compound according to the invention, the amounts of compounds (A), (B) and (C) may vary. Preferably, the molar amount of compound (C) is around two times lower than the molar amount of monoisocyanate compound (A).

Besides a urethane compound and a method, the invention also relates to an aqueous composition comprising at least one urethane compound according to the invention.

The invention also relates to an aqueous composition comprising at least one urethane compound prepared according to the method of the invention.

The aqueous composition according to the invention may also comprise at least one additive, in particular an additive selected from:
an amphiphilic compound, in particular a surfactant compound, preferably a hydroxylated surfactant compound, for example alkyl-polyalkylene glycol, in particular alkyl-polyethylene glycol and alkyl-polypropylene glycol;
a polysaccharide derivative, for example cyclodextrin, cyclodextrin derivative, polyethers;
solvents, in particular coalescing solvents, and hydrotropic compounds, for example glycol, butylglycol, butyldiglycol, monopropylene glycol, ethylene glycol, ethylene diglycol, Dowanol products (CAS number 34590-94-8), Texanol products (CAS number 25265-77-4);
antifoams, biocides.

The invention also provides an aqueous formulation which may be used in numerous technical fields. The aqueous formulation according to the invention comprises at least one composition according to the invention and may comprise at least one organic or mineral pigment or organic, organometallic or mineral particles, for example calcium carbonate, talc, kaolin, mica, silicates, silica, metal oxides, in particular titanium dioxide, iron oxides.

The aqueous formulation according to the invention may also comprise at least one agent chosen from a particle spacing agent, a dispersant, a steric stabilizer, an electrostatic stabilizer, an opacifier, a solvent, a coalescing agent, an antifoam, a preservative, a biocide, a spreading agent, a thickener, a film-forming copolymer and mixtures thereof.

Depending on the particular urethane compound or the additives that it comprises, the formulation according to the invention may be used in numerous technical fields. Thus, the formulation according to the invention may be a coating formulation. Preferably, the formulation according to the invention is an ink formulation, an adhesive formulation, a varnish formulation, a paint formulation, for example a decorative paint or industrial paint formulation. Preferably, the formulation according to the invention is a paint formulation.

The invention also provides a concentrated aqueous pigment paste comprising at least one urethane compound according to the invention and at least one organic or mineral coloured pigment.

The urethane compound according to the invention has properties that make it possible to use it for modifying or controlling the rheology of the medium comprising it. Thus, the invention also provides a method for controlling the viscosity of an aqueous composition.

This viscosity-control method according to the invention comprises the addition of at least one urethane compound according to the invention to an aqueous composition. This viscosity-control method may also comprise the addition of at least one urethane compound prepared according to the method of the invention.

Preferably, the viscosity control method according to the invention is carried out using an aqueous composition according to the invention.

Also preferably, the viscosity control method according to the invention is carried out using an aqueous formulation according to the invention.

The examples which follow make it possible to illustrate the different aspects of the invention.

EXAMPLE 1

Preparation of Urethane Compounds According to the Invention

Introduced into a 3 L glass reactor (container 1) equipped with mechanical stirring, a vacuum pump, a nitrogen inlet and heated by means of a jacket through which oil flows, are 594.4 g of compound (C) (polyethylene glycol having a molecular mass ($M_w$) of 10,000 or PEG 10, 000). This stirred medium is heated at 105° C. and placed under an inert atmosphere.

At the same time, introduced into a 100 ml glass three-necked round-bottom flask (container 2), are 39.59 g of compound (A2-2) (IPDI) to which 1.19 g of a bismuth catalyst (bismuth carboxylate) are added. The medium is purged with nitrogen then heated to 50° C. When this temperature is reached, 23.18 g of compound (A2-1) (octan-1-ol) is gradually introduced using a syringe.

After complete addition, the reaction medium is left stirring for 15 minutes. Next, it is checked that the theoretical content of NCO functions is achieved by back titration. 1 g of the reaction medium is drawn off to which an excess of dibutylamine (1 molar excess for example) is added which reacts with the isocyanate functions present in the medium. The dibutylamine that has not reacted is then titrated with hydrochloric acid (1N for example). It is then possible to deduce therefrom the amount of isocyanate functions present in the reaction medium.

Next 3.25 g of compound (B) (HDI isocyanurate) are added and left stirring for 5 minutes.

Then the content of container 2, comprising the mixture of monoisocyanate and triisocyanate compounds, is poured into container 1. The stirring is maintained for 60 minutes at 100±2° C. Then it is verified that the content of NCO functions is zero indicating the end of the reaction. The mixture is left to cool. The urethane compound 1 according to the invention is obtained.

In a similar manner, the urethane compounds 2 to 10 according to the invention are prepared. Also in a similar manner, a comparative compound C1 is prepared by omitting the addition of compound (B).

All of the reactants and proportions (% by mass) used are presented in Table 1.

TABLE 1

| | urethane compound | 1 | 2 | 3 | 4 | 5 | 6 | 7 | 8 | 9 | 10 | C1 |
|---|---|---|---|---|---|---|---|---|---|---|---|---|
| (A2-1) | octan-1-ol | 3.50 | | 3.51 | 3.51 | | | 3.52 | 1.75 | 4.29 | | 3.09 |
| (A2-1) | octan-2-ol | | | | | 3.51 | | | | | | |
| (A2-1) | Nopol* | | 4.44 | | | | | | | | | |
| (A2-1) | 2-ethylhexanol | | | | | | | | 1.75 | | 3.51 | |
| (A2-1) | isononanol | | | | | | 3.87 | | | | | |
| (A2-2) | IPDI | 5.98 | 5.94 | 6.00 | 5.99 | 5.99 | 5.96 | 6.00 | 5.99 | 7.31 | 5.99 | 5.28 |
| (B) | HDI isocyanurate | 0.49 | 0.32 | | | | 0.49 | | 0.49 | 0.60 | | |
| (B) | HDI biuret | | | 0.34 | 0.50 | 0.50 | | | | | 0.50 | |
| (B) | PDI isocyanurate | | | | | | | 0.28 | | | | |
| (C) | PEG 10,000 | 89.85 | 89.12 | 90.09 | 89.94 | 89.94 | 89.5 | 90.14 | 89.96 | | 89.94 | 91.47 |
| (C) | PEG 8,000 | | | | | | | | | 87.74 | | |
| | bismuth catalyst | 0.18 | 0.18 | 0.06 | 0.06 | 0.06 | 0.18 | 0.06 | 0.06 | 0.06 | 0.06 | 0.16 |

*6,6-dimethylbicyclo[3.1.1]hept-2-ene-2-ethanol

EXAMPLE 2

Preparation and Characterization of Aqueous Compositions of Urethane Compounds According to the Invention and of Comparative Aqueous Compositions Added to the aqueous solution of urethane compound 1 according to the invention prepared according to example 1, is a polyethoxylated fatty alcohol (Cognis Mergital D8 product) as surfactant. Then water is added. An aqueous composition comprising around 20% by mass of rheology-modifying hydrophobic urethane agent according to the invention, around 5% by mass of surfactant and around 75% of water are obtained. Next, around 1,000 ppm of a biocide (Chemipol Biopol SMV product) and around 1,000 ppm of an antifoam (Evonik Tego 1488 product) are added in order to obtain the aqueous composition 1 according to the invention.

In a similar manner, the aqueous compositions 2 to 10 according to the invention are prepared from the urethane compounds 2 to 10 according to the invention. Also in a similar manner, a comparative aqueous composition comprising the comparative compound C1 from example 1 is prepared.

All of the reactants and proportions (% by mass) used are presented in Table 2.

TABLE 2

| | urethane compound | 1 | 2 | 3 | 4 | 5 | 6 | 7 | 8 | 9 | 10 | C1 |
|---|---|---|---|---|---|---|---|---|---|---|---|---|
| (A2-1) | octan-1-ol | 0.71 | | 0.72 | 0.72 | | | 0.72 | 0.36 | 0.87 | | 0.62 |
| (A2-1) | octan-2-ol | | | | | 0.72 | | | | | | |
| (A2-1) | Nopol* | | 0.91 | | | | | | | | | |
| (A2-1) | 2-ethylhexanol | | | | | | | | 0.36 | | 0.72 | |
| (A2-1) | isononanol | | | | | | 0.79 | | | | | |
| | ethoxylated alcohol surfactant | 5.10 | 5.10 | 5.10 | 5.10 | 5.10 | 5.10 | 5.10 | 5.10 | 5.10 | 5.12 | 5.08 |
| (A2-2) | IPDI | 1.22 | 1.21 | 1.22 | 1.22 | 1.22 | 1.22 | 1.22 | 1.22 | 1.49 | 1.22 | 1.07 |
| (B) | HDI isocyanurate | 0.10 | 0.07 | | | | 0.10 | | 0.10 | 0.12 | | |
| (B) | HDI biuret | | | 0.07 | 0.10 | 0.10 | | | | | 0.10 | |
| (B) | PDI isocyanurate | | | | | | | 0.06 | | | | |
| (C) | PEG 10,000 | 18.33 | 18.18 | 18.38 | 18.35 | 18.35 | 18.26 | 18.39 | 18.35 | | 18.35 | 18.69 |
| (C) | PEG 8,000 | | | | | | | | | 17.90 | | |
| | bismuth catalyst | 0.04 | 0.04 | 0.01 | 0.01 | 0.01 | 0.04 | 0.01 | 0.01 | 0.01 | 0.01 | 0.04 |
| | Water | 74.50 | 74.50 | 74.50 | 74.50 | 74.53 | 74.50 | 74.51 | 74.50 | 74.50 | 74.48 | 74.50 |

*6,6-dimethylbicyclo[3.1.1]hept-2-ene-2-ethanol

EXAMPLE 3

Preparation and Characterization of Paint Formulations According to the Invention and of Comparative Paint Formulations A paint formulation 1 according to the invention is prepared from the aqueous composition 1 according to the invention. All of the ingredients and proportions (% by mass) used are presented in Table 3.

The paint formulations 2 to 10 according to the invention are prepared in a similar manner by replacing the aqueous composition of urethane compound from example 1 with the aqueous compositions 2 to 10.

Also in a similar manner, comparative paint formulations are prepared from aqueous compositions of known rheology-modifying compounds.

TABLE 3

| Ingredients: | amount (g): |
|---|---|
| water | 99.45 |
| dispersant (Coatex Coadis BR3) | 3.9 |
| biocide (Thor Acticide MBS) | 1.3 |
| antifoam (Evonik Airex 901W) | 1.31 |
| $NH_4OH$ (28%) | 0.5 |
| $TiO_2$ pigment (Huntsman RHD2) | 122.2 |
| $CaCO_3$ pigment (Omya Omyacoat 850 OG) | 84.5 |
| binder (BASF Acronal 290D) | 270.6 |
| monopropylene glycol | 6.5 |
| solvent (Eastman Texanol) | 6.5 |
| Antifoam (Evonik Tego 825) | 0.65 |
| aqueous composition 1 according to the invention | 28.6 |
| balance of water | q.s.f. 650 g in total |

For each of the paint formulations, the following were determined, 24 h after their preparation and at ambient temperature:

the Brookfield viscosity, measured at 25° C. and at 10 rpm and at 100 rpm, $\mu_{Bk10}$ and $\mu_{Bk100}$ (in mPa·s);

the Cone Plan viscosity or ICI viscosity, measured at high rate gradient, $\mu_I$ (in mPa·s);

the Stormer viscosity, measured at medium rate gradient, $\mu_S$ (in Krebs Units or KU, by means of the standard modulus).

The properties of the paint formulations are presented in Table 4.

TABLE 4

| formulation | $\mu_{Bk10}$ | $\mu_{Bk100}$ | $\mu_I$ | $\mu_S$ | $\mu_I/\mu_S$ |
|---|---|---|---|---|---|
| comparative | 2,960 | 1,900 | 250 | 100 | 2.5 |
| 1 according to the invention | 2,800 | 1,587 | 300 | 95 | 3.2 |
| 2 according to the invention | 3,060 | 1,818 | 310 | 100 | 3.1 |
| 3 according to the invention | 2,960 | 1,723 | 315 | 98 | 3.2 |
| 4 according to the invention | 3,080 | 1,793 | 305 | 99 | 3.1 |
| 5 according to the invention | 4,380 | 2,316 | 315 | 103 | 3.1 |
| 6 according to the invention | 2,570 | 1,472 | 285 | 94 | 3 |
| 7 according to the invention | 2,785 | 1,648 | 300 | 97 | 3.1 |
| 8 according to the invention | 2,850 | 1,685 | 300 | 97 | 3.1 |
| 9 according to the invention | 3,000 | 1,723 | 290 | 98 | 3 |
| 10 according to the invention | 2,460 | 1,427 | 270 | 92 | 2.9 |

EXAMPLE 4

Preparation and Characterization of Aqueous Compositions of Urethane Compounds According to the Invention Comprising a Latex and Comparative Aqueous Compositions Comprising a Latex The aqueous compositions containing latex are prepared by mixing, using a stirrer equipped with a turbine, 366.3 g of an acrylic binder (Encor 662 ACR Arkema Coating Resins) and alternatively:

169.95 g of water and 13.75 g of an aqueous composition comprising the urethane compound 1 according to the invention for the test incorporating 0.5% of the aqueous composition;

159.64 g of water and 24.06 g of an aqueous composition comprising the urethane compound 1 according to the invention for the test incorporating 0.875% of the aqueous composition;

149.32 g of water and 34.38 g of an aqueous composition comprising the urethane compound 1 according to the invention for the test incorporating 1.25% of the aqueous composition;

139.01 g of water and 44.69 g of an aqueous composition comprising the urethane compound 1 according to the invention for the test incorporating 1.625% of the aqueous composition;

128.7 g of water and 55 g of an aqueous composition comprising the urethane compound 1 according to the invention for the test incorporating 2% of the aqueous composition.

In a similar manner, an aqueous composition of urethane compound 2 according to the invention also comprising a latex and a comparative aqueous composition comprising a known rheology-modifying compound and a latex are prepared.

For each of the compositions, the following were determined, 24 h after their preparation and at ambient temperature:

the Cone Plan viscosity or ICI viscosity, measured at high rate gradient, $\mu_I$ (in mPa·s);

the Stormer viscosity, measured at medium rate gradient, $\mu_S$ (in Krebs Units or KU, by means of the standard modulus).

The amounts of rheology-modifying compounds used and the viscosity measurements of these compositions are presented in Table 5.

TABLE 5

| paint formulation | $\mu_I$ | $\mu_S$ | $\mu_I/\mu_S$ |
|---|---|---|---|
| comparative (Coatex Coapur 3020 product) | | | |
| containing 0.5% by weight of compound | 5 | 66 | 0.08 |
| containing 0.875% by weight of compound | 48 | 81 | 0.59 |
| containing 1.25% by weight of compound | 91 | 87 | 1.05 |
| containing 1.625% by weight of compound | 155 | 93 | 1.67 |
| containing 2% by weight of compound | 244 | 100 | 2.44 |
| urethane compound 1 | | | |
| containing 0.5% by weight of urethane compound 1 | 20 | 59 | 0.34 |
| containing 0.875% by weight of urethane compound 1 | 66 | 68 | 0.97 |
| containing 1.25% by weight of urethane compound 1 | 135 | 77 | 1.75 |
| containing 1.625% by weight of urethane compound 1 | 218 | 87 | 2.51 |

TABLE 5-continued

| paint formulation | μ$_I$ | μ$_S$ | μ$_I$/μ$_S$ |
|---|---|---|---|
| containing 2% by weight of urethane compound 1 | 323 | 95 | 3.40 |
| urethane compound 2 | | | |
| containing 0.5% by weight of urethane compound 2 | 20 | 65 | 0.31 |
| containing 0.875% by weight of urethane compound 2 | 62 | 74 | 0.84 |
| containing 1.25% by weight of urethane compound 2 | 116 | 80 | 1.45 |
| containing 1.625% by weight of urethane compound 2 | 191 | 88 | 2.17 |
| containing 2% by weight of urethane compound 2 | 274 | 94 | 2.91 |

Compared to the comparative urethane compound, the urethane compounds according to the invention make it possible to prepare aqueous compositions containing latex and also paint compositions, the viscosities of which are particularly well controlled. In particular, the viscosity $\mu_I$ is increased; the ratio $\mu_I/\mu_S$ is then systematically greater during the use of the urethane compounds according to the invention.

The invention claimed is:

1. A urethane compound, prepared in the absence of any diisocyanate compound, by a reaction of:
   (A) at least one monoisocyanate compound selected from:
      (A1) a compound comprising a single isocyanate function and
      (A2) at least one monoisocyanate compound resulting from a separate reaction of:
      (A2-1) at least one compound comprising at least one labile hydrogen atom and
      (A2-2) at least one dissymmetric diisocyanate compound,
   (B) at least one isocyanate compound selected from the group consisting of triphenylmethane-4,4',4"-triisocyanate, 1,1',1"-methylidynetris(4-isocyanatobenzene), hexamethylene diisocyanate (HDI) isocyanurate, isophorone diisocyanate (IPDI) isocyanurate, pentamethylene diisocyanate (PDI) isocyanurate, HDI biuret trimer, IPDI biuret timer, and PDI biuret trimer, and
   (C) at least one compound of formula (I):

   (HO)-L$_n$-(OH)     (I)

where each L independently represents a poly(alkylene glycol) residue and n is a number in a range of from 40 to 400,
   wherein the compound of formula (I) has a molar mass (M$_W$) in a range of from 1,500 to 20,000 g/mol, and
   wherein the components (A), (B), and (C) are present simultaneously during the reaction.

2. The urethane compound of claim 1, wherein the monoisocyanate compound (A1) is:
   a compound of formula (II):

   R—NCO     (II)

where R represents a linear, branched or cyclic, saturated, unsaturated or aromatic hydrocarbon group; or is
   a compound selected from the group consisting of an aromatic monoisocyanate compound, a polyfunctional aromatic monoisocyanate compound, an alkyl monoisocyanate compound, and a cycloalkyl monoisocyanate compound.

3. The urethane compound of claim 1, wherein the separate reaction of (A2-1) and (A2-2) is a catalyzed reaction.

4. The urethane compound of claim 1, wherein the compound (A2-1) is chosen from a compound comprising at least one labile hydrogen atom that is reactive with the dissymmetric diisocyanate compound; a compound comprising at least one hydroxyl group; a compound comprising a primary amine function or a secondary amine function; a carboxylic acid; and a mercaptan compound.

5. The urethane compound of claim 1, wherein the compound (A2-2) is a dissymmetric aromatic diisocyanate compound or a dissymmetric alicyclic diisocyanate compound.

6. The urethane compound of claim 1, wherein the compound (B) is:
   triphenylmethane-4,4',4"-triisocyanate or 1,1',1"-methylidynetris(4-isocyanatobenzene).

7. The urethane compound of claim 1, wherein the compound (C) is a compound of formula (I) where:
   each L independently represents a poly(ethylene glycol) residue; or
   n is a number in a range of from 50 to 400; or
   each L independently represents a poly(ethylene glycol) residue and n is a number in a range of from 50 to 400.

8. The urethane compound of claim 1, wherein a molar amount of compound (C) is around two times lower than a molar amount of monoisocyanate compound (A).

9. A method for preparing a urethane compound in the absence of any diisocyanate compound, the method comprising reacting: (A) at least one monoisocyanate compound selected from:
   (A1) a compound comprising a single isocyanate function and
   (A2) at least one monoisocyanate compound resulting from a separate reaction of:
   (A2-1) at least one compound comprising at least one labile hydrogen atom and
   (A2-2) at least one dissymmetric diisocyanate compound,
   (B) at least one isocyanate compound selected from the group consisting of triphenylmethane-4,4',4"-triisocyanate, 1,1',1"-methylidynetris(4-isocyanatobenzene), hexamethylene diisocyanate (HDI) isocyanurate, isophorone diisocyanate (IPDI) isocyanurate, pentamethylene diisocyanate (PDI) isocyanurate, HDI biuret trimer, IPDI biuret trimer, and PDI biuret trimer, and
   (C) at least one compound of formula (I):

   (HO)-L$_n$-(OH)     (I)

where each L independently represents a poly(alkylene glycol) residue and n is a number in a range of from 40 to 400,
   wherein the compound of formula (I) has a molar mass (M$_W$) in a range of from 1,500 to 20,000 g/mol, and
   wherein the components (A), (B), and (C) are present simultaneously during the reaction.

10. The method of claim 9, wherein the separate reaction of (A2-1) and (A2-2) is a catalyzed reaction; and/or
    the compound (A2-1) is chosen from a compound comprising at least one labile hydrogen atom that is reactive with the dissymmetric diisocyanate compound; a compound comprising at least one hydroxyl group; a compound comprising a primary amine function or a secondary amine function; a carboxylic acid; and a mercaptan compound; and/or
    the compound (A2-2) is a dissymmetric aromatic diisocyanate compound or a dissymmetric alicyclic diisocyanate compound; and/or
    the compound (C) is a compound of formula (I) where:
    each L independently represents a poly(ethylene glycol) residue; or n is a number in a range of from 50 to 400; or each L independently represents a poly(ethylene glycol) residue and n is a number in a range of from 50 to 400; and/or the compound of formula (I) has a molar mass ($M_w$) in a range of from 1,500 to 20,000 g/mol; and/or a molar amount of compound (C) is around two times lower than a molar amount of monoisocyanate compound (A).

11. An aqueous composition, comprising:

at least one urethane compound of claim 1 and optionally at least one additive selected from the group consisting of an amphiphilic compound, a polysaccharide derivative, a solvent, an antifoam, and a biocide.

12. An aqueous formulation, comprising:

at least one aqueous composition of claim 11; optionally at least one organic or mineral pigment or organic, organometallic or mineral particles; and optionally at least one agent chosen from a particle spacing agent, a dispersant, a steric stabilizer, an electrostatic stabilizer, an opacifier, a solvent, a coalescent agent, an antifoam, a preservative, a biocide, a spreading agent, a thickener, a film-forming copolymer and mixtures thereof.

13. A coating formulation comprising the aqueous formulation of claim 12.

14. A concentrated aqueous pigment paste, comprising at least one urethane compound of claim 1 and at least one colored organic or mineral pigment.

15. A method for controlling the viscosity of an aqueous composition, the method comprising adding at least one urethane compound of claim 1 to the aqueous composition.

16. The method of claim 15, wherein the aqueous composition:

comprises at least one additive selected from the group consisting of an amphiphilic compound, a polysaccharide derivative, a solvent, an antifoam, and a biocide; and/or comprises at least one organic or mineral pigment or organic, organometallic or mineral particles; and/or comprises at least one agent chosen from a particle spacing agent, a dispersant, a steric stabilizer, an electrostatic stabilizer, an opacifier, a solvent, a coalescent agent, an antifoam, a preservative, a biocide, a spreading agent, a thickener, a film-forming copolymer and mixtures thereof; and optionally is a coating composition.

* * * * *